US007804853B2

(12) United States Patent
Lanzone et al.

(10) Patent No.: US 7,804,853 B2
(45) Date of Patent: Sep. 28, 2010

(54) COMMUNICATIONS SYSTEM

(75) Inventors: Sergio Lanzone, Genoa (IT); Orazio Toscano, Genoa (IT)

(73) Assignee: Ericsson AB, Stockholm (SE)

( * ) Notice: Subject to any disclaimer, the term of this patent is extended or adjusted under 35 U.S.C. 154(b) by 1151 days.

(21) Appl. No.: 10/503,154

(22) PCT Filed: Jan. 31, 2003

(86) PCT No.: PCT/IB03/00862

§ 371 (c)(1), (2), (4) Date: Mar. 18, 2005

(87) PCT Pub. No.: WO03/065626

PCT Pub. Date: Aug. 7, 2003

(65) Prior Publication Data
US 2005/0163162 A1 Jul. 28, 2005

(30) Foreign Application Priority Data
Jan. 31, 2002 (IT) .................. MI2002A0163

(51) Int. Cl.
*H04J 3/22* (2006.01)
(52) U.S. Cl. .................................... 370/471
(58) Field of Classification Search ............. 370/220, 370/241, 242, 386, 401, 465, 466, 467, 471, 370/498, 505, 538, 539, 542, 543, 907; 709/223, 709/224, 236, 245, 251
See application file for complete search history.

(56) References Cited

U.S. PATENT DOCUMENTS 5,210,745 A 5/1993 Ferrant et al.
7,002,968 B1 * 2/2006 Tomizawa et al. ...... 370/395.52
7,103,278 B2 * 9/2006 Traverso ................... 398/79
7,143,161 B2 * 11/2006 Brissette .................. 709/224
7,415,207 B2 8/2008 Lanzone et al.
2002/0012365 A1 * 1/2002 Mueller ................... 370/536
2002/0027929 A1 * 3/2002 Eaves ...................... 370/505

FOREIGN PATENT DOCUMENTS

EP 0 660 556 A2 6/1995

(Continued)

OTHER PUBLICATIONS

ITU-T Recommendation G.709, Feb. 2001.*

(Continued)

*Primary Examiner*—Jayanti K Patel
*Assistant Examiner*—Anthony Sol
(74) *Attorney, Agent, or Firm*—Kirschstein, et al.

(57) ABSTRACT

The present invention consists of an information structure conceived for the transport of data in digital form from a transmitting element to a receiver. This structure calls for fields for transport of the data and heading information fields termed "overhead" which improve transmission reliability. This structure enables support of digital interconnections in an element of a transport network capable of switching various traffic types such as CBRx (for example STM-N e OC-N), VC-N, STS-N or ODUk. The structure also enables identification of the frame beginning, verification of the integrity and correctness of the switching, support of protection switching, and transport of quality and timing information associated with the switched entities.

2 Claims, 2 Drawing Sheets

FOREIGN PATENT DOCUMENTS

Figures 4, 5:
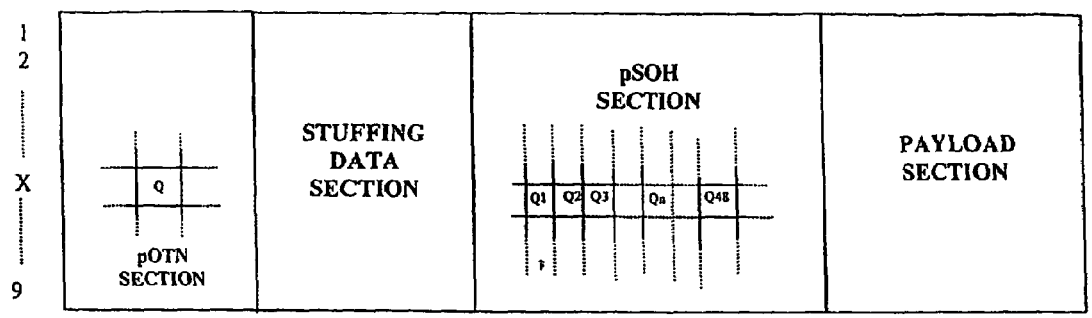

| | | |
|---|---|---|
| JP | 04-227349 | 8/1992 |
| WO | WO 99/50986 | 10/1999 |
| WO | WO 01/89110 A2 | 11/2001 |
| WO | WO 01/89119 | 11/2001 |
| WO | 02/054821 A2 | 7/2002 |

OTHER PUBLICATIONS

Draft ITU-T G.709, *Contribution to T1 Standards Project*, XX, XX, Jul. 11, 2000, pp. 1-47.

ITU=T Recommendation G.841, XX, XX, "Series G: Transmission Systems and Media, Digital Systems and Networks Types and Characteristics of SDH Network Protection Architectures", oTOBER 1998, All Pages.

BT Technology Journal, BT Laboratories, GB, A. Mcguire, et al., "*Interworking Between SDH and OTN-Based Transport Networks*", vol. 19, No. 3, Jul. 2001, pp. 143-151.

*Interface for the Optical Transport Network (OTN)*, ITU-T Recommendation G.709/Y.1331, Feb. 2001.

\* cited by examiner

Fig.1

| Col | 12 13 ... 96 | 97 ... 240 | 241 ... 4416 |
|---|---|---|---|
| Rows 1–8 | OVERHEAD (pOTN) (20) | STUFFING DATA (30) | OVERHEAD (pSOH) OR DATA (40) | PAYLOAD (50) |

(10)

Fig.2

1 ... 12 13 ... 65,66,67 ... 96 97 ... 240 241 ... 4416

| pOTN | STUFFING – DATA SECTION / STUFF | A A A X D D / D D / D / D / B B B Y D / D / C C C Z Z | pSOH & PAYLOAD SECTIONS / DATA |

(5)

Fig.3

| Row \ Col | 1 | 2 | 3 | 4 | 5 | 6 | 7 | 8 | 9 | 12 |
|---|---|---|---|---|---|---|---|---|---|---|
| 1 | A1 | A1 | A1 | A1 | A2 | A2 | A2 | A2 | | |
| 2 | | | | | | | | | | |
| ⋮ | | | | | | | | | | |

COMMUNICATIONS SYSTEM

The present invention relates to a system for communication of data in general and a structure or frame of information for the transport of data including types SDH, SONET and OTN and overhead information in a network element in a telecommunications system. A method and apparatus are also proposed.

Equipment inserted in a transport network realizing traffic data switching requires a means of transporting internally therein the traffic input interface data to the switching structure and from the switching structure to the traffic output interface.

One way of transferring the traffic data inside the network elements is to map said data with other information in a dedicated information structure suitable for transporting the interconnected entity.

Depending on the type of traffic, different information structures are needed. Handling different types of traffic in the same equipment is therefore complex.

The general purpose of the present invention is to remedy the above mentioned shortcomings by making available an information structure which would allow by itself collection and transportation of the data and information of different types of traffic and added information allowing improvement of transmission reliability.

In particular the innovative structure in accordance with the present invention is for example able to transport alternatively the following types of traffic:

Synchronous Digital Hierarchy (SDH) VC3, VC-4, VC-4-nc, where n=4, 16, 64 or 256 as defined in ITU-T Recommendation G.707.

SONET STS-1s, STS-nc, where n=3, 12, 48, 192, 768 as defined in Telecordia GR-253.

Optical Transport Network Hierarchy (OTN) ODUk, where k=1, 2 or 3 as defined in ITU-T Recommendation G.709.

Constant Bit Rate Signals (CBR) CBRx, where x=2G5, 10G, 40G as defined in ITU-T Recommendation G.709 and in particular:
  a) CBR2G5 is a constant bit rate signal of 2.488.320 kbit/s±20 ppm (for example, SDH STM-16 or SONET OC-48),
  b) CBR10G is a constant bit rate signal of 9.953.280 kbit/s±20 ppm (for example, SDH STM-64 or SONET OC-192), and
  c) CBR40G is a constant bit rate signal of 39.813.120 kbit/s±20 ppm (for example, SDH STM-256 or SONET OC-768).

Given its flexibility this type of structure is usable not only within a telecommunications system network element capable of switching only one of SDH, SONET or OTN data but also in a network element whose communication platform allows simultaneous permutation of several traffic types.

In view of this, it was sought to provide in accordance with the present invention a frame structure designed to support digital interconnections between a transmitting element and a receiving element for the alternate transport of different types of traffic between them and comprising at least an overhead section and a data section sized to allow mapping therein of the overhead information and the characteristic data of each alternatively transported traffic type.

In addition it was sought to realize a method of information transport from an input interface to an output interface of a network element capable of switching different traffic types and including the steps of forming an information transport frame comprising a plurality of fixed size sequential frames each including at least one overhead section, a data-stuffing section and a data section with the data-stuffing section and the data section being sized to be able to contain together at least the data of the traffic type which it requires most among those foreseen. Upon reception on the input interface of data of a traffic type, mapping in the frame of said data stuffing with said data all the data section and continuing in the data-stuffing section and if the traffic type requires less space that that provided in the frame, stuffing the surplus space with stuffing bytes to hold the size of the frame unchanged with changes in the type of traffic transported. An apparatus in accordance with the method and including the above mentioned structure is also proposed.

To clarify the explanation of the innovative principles of the present invention and its advantages compared with the prior art there is described below with the aid of the annexed drawings a possible embodiment thereof by way of non-limiting example applying said principles. In the drawings:

FIG. 1 shows the whole structure of the entire frame structure in accordance with the present invention, FIG. 2 shows the mapping justification mechanism of an ODU1 in the structure in accordance with the present invention, FIG. 3 shows the synchronization mechanism between the transmitter and the receiver by alignment word, FIG. 4 shows the information transport mechanism on the quality of the entity switched in the overhead sections, and FIG. 5 shows the transport mechanism for information in the overhead sections allowing verification of the accuracy and quality of the switching.

With reference to the Figures, FIG. 1 shows the whole frame structure realized in accordance with the present invention and allowing alternative transport of different traffic types while keeping all the characteristics and furthermore transporting specific additional overhead information so as to allow traffic transport from the input interface to the output interface of a generic network element using said structure.

As may be seen in the Figure, the frame structure in accordance with the present invention is organized in 4 sections, to wit, a pOTN overhead section, a data stuffing section, a pSOH overhead section and a data section.

The frame format of the present invention is structured according to a preferred embodiment in 9 rows and 4416 time slot columns for a total of 39744 bytes and a period of 125 µs (with bit rate at 2.543616 Gb/s). Columns 1 to 12 (i.e. pOTN overhead section) always contain the heading for work or overhead information transport. Column 13 to 96 (i.e. stuffing and data section) contain bytes of data/stuffing in the case of ODUk or CBRx data transport but otherwise they are completely stuffed with predetermined fixed bytes (i.e. stuffing bytes) which do not transport useful information. Columns 97 to 240 (i.e. the pSOH overhead section) contain data bytes in case of ODUk or CBRx data transport but otherwise in case of VC-n or STS-n transport they are dedicated for overhead information transport. Columns 241 to 4416 (i.e. the data section) always contain data bytes.

It should be noted that even in the case of data transport a section can contain some stuffing bytes. This is due to the difference in the sizes of the sections in accordance with the present invention, deputed to data transport, and to the different quantity of data to be transported depending on the type of interconnection entity handled. In particular the sizes of the frame sections deputed to data transport are sized for the transport of the number of data bytes of the worst case (in terms of quantity of data bytes which are to be transported)

i.e. for ODU3. Depending on the type, each interconnection entity keeps a definite number of bytes placed in definite positions in the frame.

This way the interconnection entities ODU2 and CBR10G are distributed in 4 frames containing overhead information in the pOTN overhead section and data/stuffing bytes in all the other sections of the frame. Interconnection entities VC-4-64c/STS-192c are distributed in 4 frames containing overhead information in the pOTN and pSOH overhead sections and data/stuffing bytes in all the other sections of the frame. Interconnection entities ODU3 and CBR40G are distributed in 16 frames containing overhead information in the pOTN overhead sections and data/stuffing bytes in all the other sections of the frame. Interconnection entities VC-4-256c/STS-768c are distributed in 16 frames containing overhead information in the pOTN and pSOH overhead sections and data/stuffing bytes in all the other sections of the frame.

Each frame in accordance with the present invention can transport up to 48 VC-3/STS-1 or 16 VC-4/STS-3c or 4 VC-4-4c/STS-12c or 1 VC-4-16c/STS-48c or a mixture thereof. In these cases the overhead sections (i.e. the pOTN and pSOH sections) are deputed to overhead information transport, the data-stuffing section is stuffed with stuffing bytes while the data section is used for transport of the entity with the following stuffing rules:

a VC-3/STS-1 is transported by 783 bytes (i.e. 87 columns/time slots);

a VC-4/STS-3c is transported by 2349 bytes (i.e. 261 time columns/slots);

a VC-4-4c/STS-12c is transported by 9396 bytes (i.e. 1044 time columns/slots);

a VC-4-16c/STS-48c is transported by 37584 bytes (i.e. 4176 time columns/slots).

It should be noted that mapping of VC-n/STS-n in the frame is realized assuming a preadaptation of the entities to the system clock of the network elements before mapping in the structure in question. This is due to the fact that SONET and SDH are hierarchies of synchronous transport which require synchronization of all network elements. These entities accordingly use a fixed number of bytes in the frame and always in the same position.

Concerning transport of ODUk, adaptation to the system clock of the network elements is realized only to allow adaptation of the ODUk to internal frame frequency. This is necessary to allow simultaneous interconnection both of ODUk and VC-n/STS-n within the same structure. In case of a network element assigned exclusively to ODUk switching, because OTN is not a synchronous transport hierarchy, adaptation to a single system synchronism would not be necessary. Adaptation is realized during mapping of the interconnected entity within the frame in question. After interconnection the clock of the entity is recovered and the OTN signal is generated with its original timing. This means that the number of bytes of ODUk data transported by the structure in accordance with the present invention can vary and consequently also the position of the ODUk in it.

To support this adaptation a justification mechanism is supported in the data stuffing section of the frame.

Before mapping in the internal frame, 8 bytes (i.e. 6 for an alignment word, 1 for control and 1 for parity verification) are added for each block of 3824 bytes of the ODUk.

In case of ODU1 transport, the structure in accordance with the present invention calls for a justification mechanism capable of mapping in a range of [39122-39128] bytes of data per frame and capable of supporting any difference admitted by the standards between the frequency of the entering traffic signal and the system clock of the network elements.

FIG. 2 shows the justification mechanism for the mapping of an ODU1 in the frame in question.

As may be seen in the Figure, the stuffing-data section is partly filled with the stuffing bytes (i.e. empty cells in the FIG) and data bytes (i.e. D cells in the FIG). In addition, up to 6 bytes are expected to be stuffed with stuffing bytes or data bytes (i.e. cells X, Y and Z in the FIG). The content of the latter depends on the difference of frequency between ODU1 and system frequency and is controlled by a codified protocol respectively in the control cells A, B and C. The value of the protocol is copied three times in the same frame (i.e. 3 bytes A, B, C are present in the same frame) to allow correct interpretation through majority voting.

The same mechanism is used for mapping of ODU2 and ODU3. Naturally, because of the different number of bytes to be transported per frame in the case of ODU2 and ODU3 the justification mechanism control bytes are placed in different cells in the stuffing-data section with respect to the ODU1 transport.

The CBRx signals are transported in the structure through a preadaptation of the CBRx bit rate to the related ODUk (i.e. CBR2G5 -> ODU1, CBR10G -> ODU2 and CBR40G -> ODU3). This preadaptation is achieved by adding stuff bytes and a frame alignment signal is added to identify the position of the "pseudo ODU" (i.e. the adapted CBRx) within the frame.

As mentioned above, the structure described here calls for a frame section termed overhead dedicated to housing the overhead information.

First of all a frame alignment word is inserted at the source to allow identification of the beginning of each frame at the destination.

This alignment word must have a rather resistant code so as to reduce to a minimum the chance that a similar sequence might be found in the rest of the frame and cause false alignments.

For example, as shown in FIG. 3, an alignment word made up of 8 bytes and containing the hexadecimal value A1 in the first 4 bytes and A2 in the second four meets the requirements of resistance and can be located in the first 8 bytes of row 1 of the pOTN overhead section.

In addition the innovative structure also calls for a multi-frame alignment signal, e.g. a counter [0-255] and by means of this counter [0-255] it is possible to identify intervals up to 32 ms.

Additional information on the quality of the traffic received from the input interface will be transmitted to the switching structure to realize network protection. The most common network protection diagrams call for traffic data duplication at some point along the path, transmission along two different sub-paths (i.e. work and protection) and at the end point of the protected subnetwork selection of one of the two signals on the basis of a quality criterion. If the selection is made at the switching structure level and if the quality is monitored at the input traffic interface level this information will be forwarded to the communication structure. Forwarding will be the fastest possible to allow the structure immediate selection of the intact traffic. One solution consists of associating the quality information with the associated entity interconnected in the same means used to transmit the traffic data from the input interface to the switching structure. This way the switching structure can monitor the work and protection quality information and consequently select the traffic which must be routed along the network.

The structure of the present invention calls for a frame section dedicated to housing the quality information of each interconnected entity transported in it.

For example, as shown in FIG. 4, in the overhead section pOTN in a dedicated byte Q the quality of the ODUk or the STM-n/OC-n transported will be codified while in the overhead section pSOH 48 Qn bytes will be dedicated to the coding of the quality of the VC-n/STS-n transported.

A possible coding is the following:

If from the input interface a serious defect on the switched entity is found the hexadecimal value 02 will be inserted in the quality byte (Q) associated with the entity in question.

If from the input interface an error rate on the switched entity is found such that it does not completely discredit the quality thereof but only indicates a deterioration, the hexadecimal value 01 will be encoded.

If no defect and deterioration on the switched entity from the input interface is found the hexadecimal value 00 will be encoded.

In addition, since some of the network protection schemes (for example MSP and MS-Spring as defined in ITU-T G.841 for SDH) call for a standardized Automatic Protection Switching (APS) protocol to coordinate the behavior of the two switching nodes through dedicated bytes in the overhead (OH) of the traffic signals (for example, bytes K1 and K2 in the multiplex section of an STM-n signal, APS bytes in the overhead of an ODUk) the frame in accordance with the present invention is structured to transport for each type of interconnected entity the APS commands detected at the traffic input interface to the switching structure. In the switching structure-traffic interface direction the frame also transports the protection state.

To allow fast implementation of the 1:N protection diagrams (for example MPS 1:N as defined in ITU-T G.841 for SDH) between the traffic interfaces with different configurations the structure dedicates a section of the overhead to the transport of a protocol between traffic interfaces and the switching structure. Upon reception of a command through the APS protocol or detection of poor quality of an interconnected entity involved in a 1:N protection, the switching structure instructs the protection interface to take on the configuration of the faulty one. In the opposite direction the protection interface confirms the adoption of the configuration request.

The frame in accordance with the present invention is also structured to support protection switching methods which perform switching actions at both ends of the protection entity (for example connection, path) even in case of one-way failure (i.e. dual ended protections).

Another mechanism can be provided for monitoring the correctness of the traffic routing in the network element. This is necessary to monitor the quality (i.e. the network element does not cause traffic deterioration) and connection correctness (the network element ensures connection between each pair of input & output ports without introducing erroneous connections). This mechanism must allow end to end monitoring of the traffic data path in the network element (i.e. traffic input & output interfaces).

In addition, assuming a distributed network element (i.e. traffic and switching structure interfaces in different sites) or a switching structure organized in different stages (for example, a Clos switching structure) there will be realized the monitoring of each path section of the entity interconnected in the network element (i.e. from the traffic input interface to the switching structure, between each switching structure stage, and from the switching structure to the traffic output interface.

A way of obtaining these types of control is to insert in the inner frame a frame source identifier (Path Trace) and a monitoring error code calculated after scrambling (for example the Bit Interleave Parity (BIP) defined by ITU-T G.707).

At the terminal point the Path Trace is extracted and compared with the expected one. Detection of an inequality identifies a connection error.

Parity calculation is done at the destination before de-scrambling and then compared with the BIP contained in the next frame extracted after de-scrambling.

A frame section is dedicated to implementing Path Trace and Parity Check of the end to end path of the interconnected entity in the network element.

Another frame section is dedicated to implementing the same checks for a path segment from end to end of the interconnected entity in the network element.

For example, as shown in FIG. 5, it is possible to dedicate in the pOTN overhead section three bytes (for example, A B C) for control of the whole input output traffic interface path of the structure in case of switching of CBRx signals or ODUk entities. Two bytes (for example A and B) will be dedicated to containing a univocal (i.e. unique) structure generator identifier while a third (for example C) will contain the generated structure parity. Again in the same case, another three bytes (for example E and F and G) can be dedicated to making the same type of controls but on individual path sections from the structure to the inside of the network element.

As protection switching realized by the switching structure could cause detection of a parity or path trace error at the end point located on the traffic output interface, a section of the structure is dedicated to the transport of an activation and deactivation protocol for detection of the error.

The frame is also designed to transport time information.

The system clock of a network element inserted in a synchronous transport network is generally hooked to a synchronization source selected from a set of possible sources including the traffic interfaces (for example STM-n signals in SDH).

By means of a pointer mechanism, the frame allows the transport, together with the traffic data to be switched, of up to two timing signals from the traffic interface which can even be hundreds of meters distant up to the network element core where selection of the timing source is done.

The position of the timing signal edge in the data frame in accordance with the present invention is identified by a particular pointer value in the dedicated overhead bytes of the frame. The pointer value is copied n times in the same frame overhead to allow correct interpretation at the destination through majority voting. In case of a faulty reference timing signal a particular value will be inserted in this field to indicate that the pointer value is not valid.

The synchronization quality information (also called SSM-Timing Marker) of the timing signal transported by the frame through the pointer mechanism is also contained in a dedicated section of the inner frame.

To avoid protection switching because of an error in information transmission by means of the inner frame from the traffic input interface to the switching structure, a byte dedicated to parity control is provided in the structure in accordance with the present invention to verify the quality of the overhead section transporting the quality information, the APS command and the dual ended data of the interconnected entities and the timing signal synchronization quality information. In other words, a bit of the pOTN or pSOH section interpreted wrongly by the switch because of a momentary and local deterioration could cause erroneous protection tripping. For this reason a finer control is inserted in the fields bearing a certain type of information.

To facilitate alarm correlations in the network element the frame supports information exchange between the traffic input and output interfaces. If at the output traffic level a basic error detection communication is detected in a dedicated byte of the frame in question, any possible correlated defect detected on the interconnected entity is suppressed.

It is now clear that the predetermined purposes have been achieved by making available a flexible frame structure allowing transport of all information and data necessary for transport of various types of traffic in the network element. In particular the frame allows CBRx traffic transport without distinction (for example STM-N and OC-N), VC-N, STS-N and ODUk.

In accordance with the present invention it is thus possible to have an information structure consisting of traffic data transport fields and heading information fields organized in frames which are repeated with relatively high frequency (advantageously every 125 µs) and which can be used transparently to support digital interconnections in a element of a transport network capable of switching Optical Data Units (ODU), or synchronous transport modules (Synchronous Digital Hierarchy) STM-N, SONET synchronous transport signals STS-N derived from OD-N optical carriers, or virtual containers SDH VC-3, VC-4 and/or VC-4-nc, where n=4, 16, 64, 256, and/or synchronous transport systems SONET STS1s, STS-nc, where n=3, 12, 48, 192, or 768 as defined in Telecordia GR253.

In addition, in the structure are supplied means for identification of the frame start, verification of the integrity and correctness of the switching, protection switching and transporting the quality and timing information associated with the switched entities.

The above description of an embodiment applying the innovative principles of the present invention is given by way of non-limiting example of said principles within the scope of the exclusive right claimed here. For example, additions to or variants of the structure can be considered to expand or integrate the information transported and the performance of the system. An apparatus in accordance with the method and structure proposed is readily realisable to those skilled in the art.

The invention claimed is:

1. A method of transporting traffic information from an input interface to an output interface of a network element capable of switching different types of traffic information, the method comprising the steps of:
    forming an information transport frame structure comprising a plurality of fixed size sequential frames with each frame comprising at least one overhead section, one data stuffing section, and a data section, the data stuffing section and the data section being sized for containing together at least the traffic type which requires most capacity among those expected and,
    upon reception on the input interface of data of a traffic type, mapping in the frame said data filling with said data all the data section, and continuing in the data stuffing section and, if the traffic type requires less space than that arranged in the frame, filling extra space with stuffing bytes to maintain the frame size with a change in transported traffic type,
    configuring the structure with fixed dimensions and being repeated at regular intervals, and
    the traffic type transported being one of optical data unit-index unit k (ODUk), synchronous transport signals (STS-n), synchronous digital hierarchy (SDH) virtual containers (VC-n), or constant bit rate signals (CBRx).

2. An apparatus, comprising:
    at least one input interface;
    at least one output interface; and
    a transmitter for transmitting data between the interfaces in a frame structure for supporting digital interconnections between a transmitting element and a receiving element for alternatively transporting therebetween different types of alternative traffic including traffic comprised in optical data unit-index unit k (ODUk) traffic and traffic not comprised in ODUk traffic,
    the structure having at least one overhead section sized to allow mapping therein of overhead information, and a data section sized to allow mapping therein of characteristic data of each type of alternative traffic transported,
    the structure having fixed dimensions and being repeated at regular intervals, and
    wherein the traffic type transported is one of ODUk, synchronous transport signals (STS-n), synchronous digital hierarchy (SDH) virtual containers (VC-n) or constant bit rate signals (CBRx).

* * * * *

UNITED STATES PATENT AND TRADEMARK OFFICE
CERTIFICATE OF CORRECTION

PATENT NO. : 7,804,853 B2  
APPLICATION NO. : 10/503154  
DATED : September 28, 2010  
INVENTOR(S) : Lanzone et al.

Page 1 of 1

It is certified that error appears in the above-identified patent and that said Letters Patent is hereby corrected as shown below:

On Page 2, item (56), under "FOREIGN PATENT DOCUMENTS", in Column 1, Line 1, delete "8/1992" and insert -- 8/2004 --, therefor.

On Page 2, item (56), under "OTHER PUBLICATIONS", in Column 2, Line 3, delete "oTOBER" and insert -- October --, therefor.

Signed and Sealed this
Fourth Day of October, 2011

David J. Kappos
*Director of the United States Patent and Trademark Office*